July 29, 1952 A. H. FREDRICK 2,605,422

PULSE GENERATOR

Filed Nov. 26, 1945

INVENTOR
ARDEN H. FREDRICK

BY M. O. Hayes

ATTORNEY

Patented July 29, 1952 2,605,422

UNITED STATES PATENT OFFICE 2,605,422

PULSE GENERATOR

Arden H. Fredrick, Boston, Mass., assignor, by mesne assignments, to the United States of America as represented by the Secretary of the Navy Application November 26, 1945, Serial No. 630,940

12 Claims. (Cl. 250—36)

This invention relates to a circuit for producing short-duration marking pulses and, more particularly, to a circuit for producing two series of marking pulses, one series of which is variable in time phase with respect to the other series.

One conventional type of marking pulse generator includes a frequency-stabilized oscillator which controls the repetition rate of a multivibrator or sawtooth generator followed by differentiating and clipping circuits to shape the wave thus produced to the form required by the marking pulse. A disadvantage of this type of generator is the added complexity of these shaping circuits.

Another conventional type of marking pulse generator includes a frequency-stabilized oscillator having a current-differentiating choke in the cathode circuit. Disadvantages of this type of generator are that the output pulses, if taken from the cathode circuit, are broad and of small amplitude, and if taken from the plate circuit are difficult to use because of the high impedance across the output terminals.

It is an object of this invention to provide a marking pulse generator which does not require complex shaping circuits.

It is a further object of this invention to provide a marking pulse generator which produces narrow pulses having high amplitude.

It is a further object of this invention to provide a marking pulse generator which is frequency-stabilized by a piezo-electric crystal.

It is a further object of this invention to provide a marking pulse generator which produces two series of marking pulses, the pulses of one series being adjustable in time phase with respect to the pulses of the other series.

These and other objects will be more apparent upon consideration of the following description together with the accompanying drawing in which.

Figure 1:
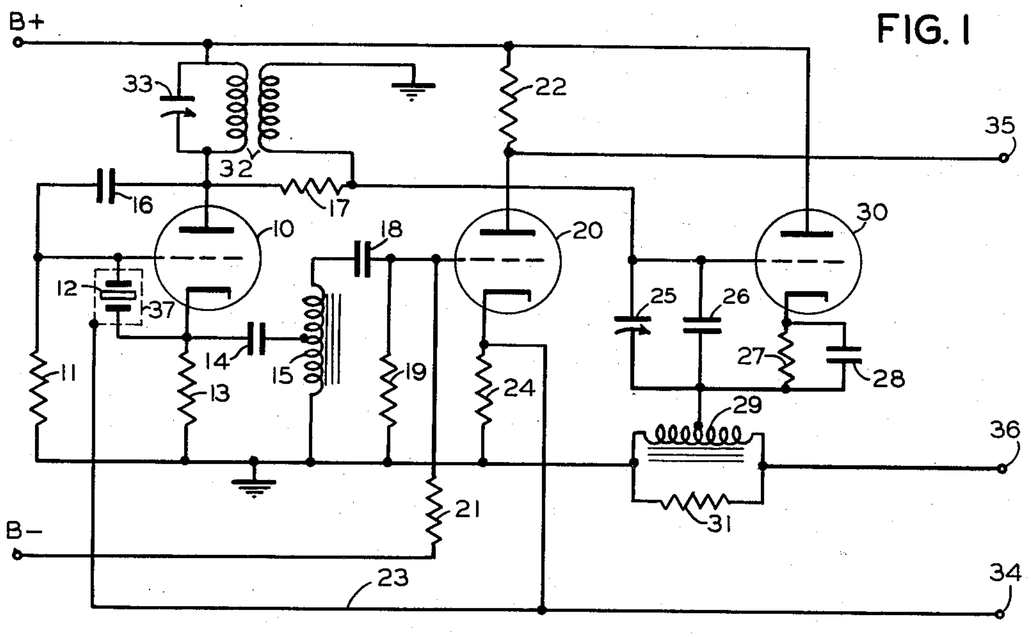
Fig. 1 is a circuit diagram of an embodiment of the invention.

Specifically, with reference to the embodiment of this invention shown schematically in Fig. 1, the circuit comprises an oscillator tube 10 frequency-stabilized by a piezo-electric crystal 12 placed in the grid-cathode circuit. The load impedance for the oscillator tube is provided by the tuned primary of transformer 32 with its coupled impedance, and by the cathode resistor 13 and its associated coupled circuits. Regeneration at the resonant frequency of the frequency-stabilizing element is provided by capacitor 16 in parallel with the grid-plate capacitance of the oscillator tube. Oscillation is initiated by some transient impulse in the usual manner and continues at a frequency determined principally by the characteristics of the piezo-electric crystal. During a part of the cycle of oscillation, the grid of tube 10 is driven positive with respect to the cathode, causing grid current to flow through resistor 11. The voltage drop across resistor 11 due to this flow of grid current produces a negative bias voltage on the grid of tube 10, which is maintained by the stray capacitance of the grid circuit to ground. Because of the negative bias thus produced, grid current is permitted to flow during only a portion of the positive one-half cycle of alternating grid voltage. Likewise the time of flow of total space current is limited to some fraction of one-half cycle, resulting in periodic space current pulses as shown in waveform B of Fig. 2. These space current pulses, flowing through resistor 13, produce a voltage drop across this resistor. This voltage drop is impressed across the primary of the auto-transformer 15 through a direct current blocking capacitor 14, causing a current to flow in the auto-transformer 15 in response to the discontinuities of the space current pulses as shown in waveform C of Fig. 2. The value of resistor 19 is so chosen that the parallel resonant impedance formed by the self-inductance of the auto-transformer in combination with the distributed capacitance of the circuit is critically damped, thus preventing oscillation and consequent periodical reversal of polarity during the pulse.

A voltage pulse, the amplitude of which is proportional to the rate of change of the primary current with respect to time, is produced across the secondary of the auto-transformer 15 and is impressed between the grid of the paraphase amplifier tube 20 and ground through the direct current blocking capacitor 18. Tube 20 is supplied with a negative grid bias through resistor 21, so adjusted that the operating point of tube 20 is near plate current cutoff in the non-linear region of its grid voltage versus plate current characteristics. A negative voltage pulse applied to the grid of tube 20 causes very little change in space current, because of the operating point chosen. A positive voltage pulse, however, causes a suddent increase in the space current flowing through resistors 22 and 24. The voltage drop thus produced across resistor 24 (between terminal 34 and ground), as shown in waveform D of Fig. 2, is used as the positive marking pulse; that across resistor 24 in series with tube 20 (between terminal 35 and ground) is used as the negative marking pulse output.

A regenerative loop 23 is provided, by means of which a portion of the positive pulse output developed across resistor 24 is introduced into the grid of tube 10 through a small capacitor, in this embodiment through the distributed capacitance of the piezo-electric crystal holder shield 37. This positive feed-back of energy at the pulse frequency effectively increases the amplitude of the pulse during its formation by partially neutralizing the effects of degeneration due to the cathode load impedance.

Figure 2:
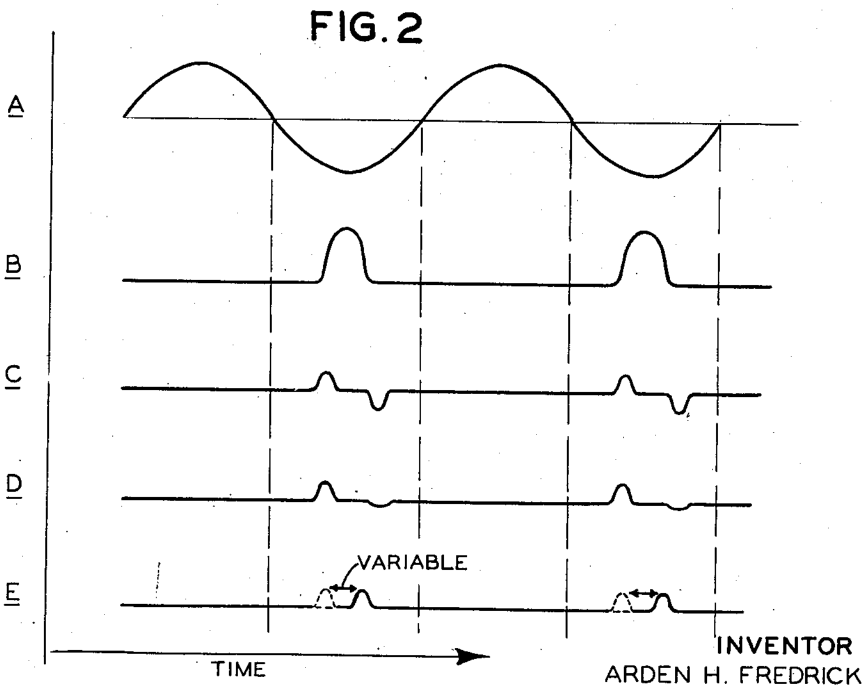
Fig. 2 is a graphical representation of certain wave forms which occur in the embodiment of Fig. 1.

A sinusoidal voltage, alternating at a frequency determined by the piezo-electric crystal, is developed across the parallel-resonant impedance formed by the primary of transformer 32 and capacitor 33 as shown in waveform A of Fig. 2. A fundamental condition of operation is that this impedance appears as an inductive reactance at the operating frequency of the crystal. The secondary of transformer 32 is tuned by means of capacitor 25. The time phase of the secondary voltage with respect to the primary voltage can be varied by tuning the secondary of transformer 32 with capacitor 25 so that it is parallel-resonant at a higher or lower frequency than that of the primary voltage. An additional lagging phase shift is introduced by resistor 17 and the secondary tuned circuit reactance, so that the phase of the secondary voltage may be adjusted to lag the primary voltage by the desired amount.

The variable-phase sinusoidal voltage thus produced is impressed between the grid of tube 30 and ground. The voltage drop produced by the space current of tube 30 flowing through resistor 27 causes the cathode of tube 30 to be at a positive potential with respect to the grid, placing the operating point in the non-linear region of the grid voltage versus plate current characteristic of the tube very near plate current cut-off. During that part of the grid-voltage cycle when the grid is negative with respect to the cathode, the plate current is reduced to zero, resulting in a very small change of current in the primary of auto-transformer 29. During the positive one-half cycle, however, the space current of tube 30, flowing through the primary of auto-transformer 29 is suddenly increased. A voltage is induced in the secondary which is proportional to the rate of change of the primary current with respect to time. The value of resistor 31 is so chosen that the parallel-resonant impedance formed by the self-inductance of auto-transformer 29 and distributed circuit reactance is critically damped. The voltage drop across resistor 31 (between terminal 36 and ground), as shown in waveform E of Fig. 2, is used as the variable time-phase positive marking pulse output to produce at terminal 36 a series of pulses variable in time phase with respect to the series of pulses at terminal 34.

The small negative pulses which appear in the positive pulse output circuits can be eliminated if they are undesirable by electrically connecting any non-linear element, such as a germanium crystal, between the common ground and the secondary of auto-transformer 15 and between ground and the secondary of auto-transformer 29. In this case the values of resistors 19, 21, and 31 can be chosen to provide proper grid bias potentials without regard to producing critical damping of the resonant circuit oscillations.

The invention is only to be limited by the appended claims.

What is claimed is:

1. A generator for producing a series of pairs of marking pulses, the time spacing of said pairs being variable, said generator comprising, an oscillator circuit including an electron tube, a tuned anode circuit, a cathode circuit and a positive feedback circuit coupled between said anode circuit and the grid-cathode circuit of said electron tube, the current in said cathode circuit comprising a series of recurrent pulses, an auto-transformer coupled to said cathode circuit, critical damping means connected in shunt with the output of said auto-transformer, amplifying means coupled to said auto-transformer adapted to amplify only positive pulses in the output thereof thereby to produce a first pulse in each of said pairs, phase shifting means coupled to said tuned anode circuit, second amplifier means coupled to said phase shifting means, said second amplifier being so biased that the anode current therein comprises a series of recurrent pulses occurring in a predetermined time relationship to the signal coupled from said phase shifting means, said second amplifier including a second auto-transformer in the output thereof for amplifying said series of anode current pulses in said second amplifier, the output signal of said second auto-transformer being a second pulse in each of said pairs.

2. A generator, as in claim 1, wherein said phase shifting means is adjustable to vary the time spacing between pulses in said pairs.

3. A generator, as in claim 1, wherein said oscillator circuit includes a piezo-electric crystal to control the frequency thereof.

4. A generator, as in claim 1, wherein said electron tube in said oscillator circuit includes a control grid, said generator further comprising a piezoelectric crystal connected between the cathode and control grid of said electron tube and feedback means from said first-mentioned amplifying means to the grid of said electron tube in said oscillator circuit.

5. A generator for producing a series of pairs of marking pulses, said generator comprising, an oscillator circuit including an electron tube, a tuned anode circuit, a cathode circuit and a positive feedback circuit coupled between said anode circuit and the grid-cathode circuit of said electron tube, the current in said cathode circuit comprising a series of recurrent pulses, pulse amplifying means coupled to said cathode circuit, the output signal of said pulse amplifying means comprising one pulse in each of said pairs, phase shifting means coupled to said tuned anode circuit, and pulse generating amplifier means coupled to said phase shifting means, said pulse generating amplifier means producing a series of pulses in predetermined time relationship to the signal from said phase shifing means, said last-mentioned series of pulses comprising a second pulse in each of said pairs.

6. A generator for producing a series of pairs of marking pulses, said generator comprising, an oscillator circuit including an electron tube, a tuned anode circuit, a cathode impedance and a positive feedback circuit coupled between said anode circuit and the grid-cathode circuit of said electron tube, the current in said cathode impedance comprising a series of recurrent pulses having a predetermined time relationship to oscillatory signals in said tuned anode circuit, pulse amplifying means coupled to said cathode impedance, the output signal of said pulse amplifying means comprising one pulse in each of said pairs of pulses, phase shifting means coupled to said tuned anode circuit and a non-linear amplifying means coupled to said phase shifting means, said last-mentioned amplifying means being adapted to produce a series of pulses having a predetermined time relationship to the signal from said phase shifting means, said last-mentioned series of pulses comprising a second pulse in each of said pairs.

7. A generator as in claim 6 wherein said phase shifting means is adjustable, the time spacing between pulses in each of said pairs being dependent on the adjustment of said phase shifting means.

8. A generator for producing a series of marking pulses comprising an oscillator tube having at least an anode, a cathode and a control grid, a parallel inductor-capacitor circuit coupled between said anode and a source of anode potential, a resistor coupled between said cathode and a point of reference potential, feedback means coupling said anode to said grid, frequency stabilizing means coupling said grid to said cathode, an auto-transformer having one terminal thereof coupled to said point of reference potential, a first capacitor coupled between said cathode and an intermediate tap on said auto-transformer, and a serially connected resistor-capacitor combination connected between said point of reference potential and a second terminal of said auto-transformer, whereby the signal appearing between the junction of said resistor-capacitor combination and said point of reference potential is a series of uniformly spaced pulses.

9. A generator for producing a series of marking pulses comprising an oscillator tube having at least an anode, a cathode and a control grid, a parallel inductor-capacitor circuit coupled between said anode and a source of anode potential, a resistor coupled between said cathode and a point of reference potential, feedback means coupling said anode to said grid, frequency stabilizing means coupling said grid to said cathode, an auto-transformer having one terminal thereof coupled to said point of reference potential, a first capacitor coupled between said cathode and an intermediate tap on said auto-transformer, a serially connected resistor-capacitor combination connected between said point of reference potential and a second terminal of said auto-transformer, said resistor-capacitor combination and said auto - transformer forming a critically damped circuit, a non-inverting amplifier means having the input thereof coupled across the resistor of said resistor-capacitor combination, the output signal of said amplifier comprising a series of spaced pulses.

10. A pulse generator as in claim 9, said pulse generator further comprising means coupling the output of said amplifier to said frequency stabilizing means thereby to increase the amplitude of said spaced pulses during the formation thereof.

11. A generator for producing a series of pairs of marking pulses, said generator comprising an oscillator tube having at least an anode, a cathode and a control grid, a transformer having a primary and a secondary winding, said primary winding being coupled between said anode and a source of anode potential, a resistor coupled between said cathode and a point of reference potential, feedback means coupling said anode to said grid, a first capacitor connected in shunt with said primary winding for tuning said primary winding, an auto-transformer having one terminal thereof coupled to said point of reference potential and an intermediate tap coupled to said cathode through a second capacitor, an amplifier having a resistor-capacitor input circuit, said input circuit being connected across the winding of said auto-transformer, said auto-transformer and said input circuit constituting a critically damped tuned circuit, said amplifier providing one series of marking pulses at the output thereof, a resistor coupling a first terminal of said secondary winding to said anode, a second terminal of said secondary winding being returned to a point of fixed potential, means for tuning said secondary winding, and a pulse forming amplifier coupled to said first terminal of said secondary winding, the output of said pulse forming amplifier providing a second series of pulses, pulses of said first and second series occurring in pairs, the spacing between said pairs being a function of the relative resonant frequencies of the tuned circuits formed by said primary winding and said first capacitor and said secondary winding and said tuning means therefor.

12. A generator as in claim 11 wherein said pulse forming amplifier comprises a second auto-transformer and an impedance connected in shunt therewith, said auto-transformer and said impedance constituting a critically damped tuned circuit at the self-resonant frequency thereof and an electron tube coupled between said second auto-transformer and a source of anode potential so as to control the flow of current through at least a portion of the winding of said auto-transformer, said electron tube having a control grid connected to said first terminal of said secondary winding.

ARDEN H. FREDRICK.

REFERENCES CITED

The following references are of record in the file of this patent:

UNITED STATES PATENTS

| Number | Name | Date |
|---|---|---|
| 2,226,459 | Bingley | Dec. 24, 1940 |
| 2,237,661 | Ernst | Apr. 8, 1941 |
| 2,397,150 | Lyman | Mar. 26, 1946 |
| 2,408,061 | Grieg | Sept. 24, 1946 |
| 2,452,547 | Chatterjea et al. | Nov. 2, 1948 |